(12) United States Patent
Lei et al.

(10) Patent No.: US 10,268,207 B2
(45) Date of Patent: Apr. 23, 2019

(54) AUTONOMOUS VEHICLE NETWORK BANDWIDTH BRIDGING

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 15/455,947

(22) Filed: Mar. 10, 2017

(65) Prior Publication Data

US 2018/0259974 A1    Sep. 13, 2018

(51) Int. Cl.

| | | |
|---|---|---|
| *G05D 1/02* | (2006.01) |
| *H04L 29/08* | (2006.01) |
| *H04B 1/3822* | (2015.01) |
| *G08G 1/04* | (2006.01) |
| *H04L 12/26* | (2006.01) |
| *H04L 12/24* | (2006.01) |
| *H04W 24/02* | (2009.01) |
| *H04L 29/06* | (2006.01) |
| *H04W 4/44* | (2018.01) |
| *H04W 4/80* | (2018.01) |
| *H04W 84/00* | (2009.01) |
| *H04W 84/12* | (2009.01) |
| *H04W 28/00* | (2009.01) |

(52) U.S. Cl.
CPC ........... *G05D 1/0285* (2013.01); *G05D 1/024* (2013.01); *G05D 1/0246* (2013.01); *G08G 1/04* (2013.01); *H04B 1/3822* (2013.01); *H04L 41/0896* (2013.01); *H04L 43/062* (2013.01); *H04L 43/0888* (2013.01); *H04L 67/1025* (2013.01); *H04L 67/125* (2013.01); *H04L 69/14* (2013.01); *H04W 4/44* (2018.02); *H04W 24/02* (2013.01); *H04W 4/80* (2018.02); *H04W 28/00* (2013.01); *H04W 84/005* (2013.01); *H04W 84/12* (2013.01)

(58) Field of Classification Search
CPC .. G08G 1/0104; G08G 1/0112; H04B 1/3822; H04B 1/3827; H04L 41/0896; H04L 43/062; H04W 84/005; H04W 84/12
See application file for complete search history.

(56) References Cited

U.S. PATENT DOCUMENTS

| | | | |
|---|---|---|---|
| 9,355,423 B1* | 5/2016 | Slusar | G06Q 40/08 |
| 9,380,493 B2 | 6/2016 | Scheim et al. | |
| 9,432,402 B1* | 8/2016 | McKeeman | H04L 63/20 |
| 9,479,999 B2 | 10/2016 | Zhang et al. | |
| 9,607,449 B1* | 3/2017 | Chen | G07C 5/008 |
| 9,786,171 B2* | 10/2017 | Prokhorov | G08G 1/0965 |

(Continued)

*Primary Examiner* — Thomas G Black
*Assistant Examiner* — Sara J Lewandroski
(74) *Attorney, Agent, or Firm* — Frank L. Lollo; Brooks Kushman P.C.

(57) ABSTRACT

A telematics controller is connected to a first modem to communicate over a wide-area network. An autonomous vehicle controller is connected to a second modem to communicate over the network, and is programmed to send autonomous vehicle commands determined using autonomous vehicle data to control the vehicle. A scheduler controller is programmed to direct the telematics controller and autonomous vehicle controller to offload autonomous vehicle data over the network using the first and second modems.

16 Claims, 4 Drawing Sheets

(56) References Cited

U.S. PATENT DOCUMENTS

| | | | |
|---|---|---|---|
| 2006/0109107 A1* | 5/2006 | Staton | B60R 25/00 340/539.13 |
| 2011/0080868 A1* | 4/2011 | Krishnaswamy | H04W 48/18 370/328 |
| 2014/0159935 A1* | 6/2014 | de Graauw | G01S 7/03 342/21 |
| 2014/0282747 A1* | 9/2014 | Richman | H04N 21/2146 725/62 |
| 2016/0080235 A1* | 3/2016 | Tan | H04L 43/0888 370/235 |
| 2016/0080279 A1* | 3/2016 | Tan | H04W 40/20 370/328 |
| 2016/0095157 A1* | 3/2016 | Wenzel | H04L 69/325 370/329 |
| 2018/0020442 A1* | 1/2018 | Nair | H04W 12/04 |
| 2018/0026894 A1* | 1/2018 | Chandran | H04L 41/082 370/236 |

\* cited by examiner

AUTONOMOUS VEHICLE NETWORK BANDWIDTH BRIDGING

TECHNICAL FIELD

Aspects of the disclosure generally relate to methods and apparatus for combining network bandwidth from multiple connections for use by autonomous vehicles.

BACKGROUND

In a vehicle telematics system, a telematics control unit (TCU) may be used for various remote control services, such as over the air (OTA) software download, eCall, and turn-by-turn navigation. An autonomous vehicle is a vehicle that is capable of sensing its environment and navigating without human input. As compared to traditional telematics systems, autonomous vehicles may have greater data upload and download requirements.

SUMMARY

In one or more illustrative embodiments, a vehicle includes a telematics controller, connected to a first modem to communicate over a wide-area network; an autonomous vehicle controller, connected to a second modem to communicate over the network, programmed to send autonomous vehicle commands determined using autonomous vehicle data to control the vehicle; and a scheduler controller programmed to direct the telematics controller and autonomous vehicle controller to simultaneously communicate autonomous vehicle data over the network using the first and second modems.

In one or more illustrative embodiments, a method includes sending a prioritized subset of autonomous vehicle data, to a remote server connected to a wide-area network, simultaneously using a combination of connections to the wide-area network provided using at least two of a telematics controller modem, an autonomous vehicle controller modem, and a vehicle WiFi transceiver; and offloading a non-prioritized subset of autonomous vehicle data using the autonomous vehicle controller modem but neither the telematics controller modem nor the vehicle WiFi transceiver.

In one or more illustrative embodiments, a non-transitory computer-readable medium comprising instructions that, when executed by one or more processors of a vehicle, cause the one or more processors to connect to a wide-area network by a first modem of an autonomous vehicle controller using a first service provider; connect to the wide-area network by a second modem of a telematics controller using a second service provider; receiving first autonomous vehicle data from another vehicle via a wireless transceiver of the telematics controller; receiving second autonomous vehicle data from sensors of the vehicle; and responsive to determining that vehicle settings permit offloading of autonomous vehicle data, direct the telematics controller and autonomous vehicle controller to offload the first and second autonomous vehicle data over the wide-area network using the first and second modems.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
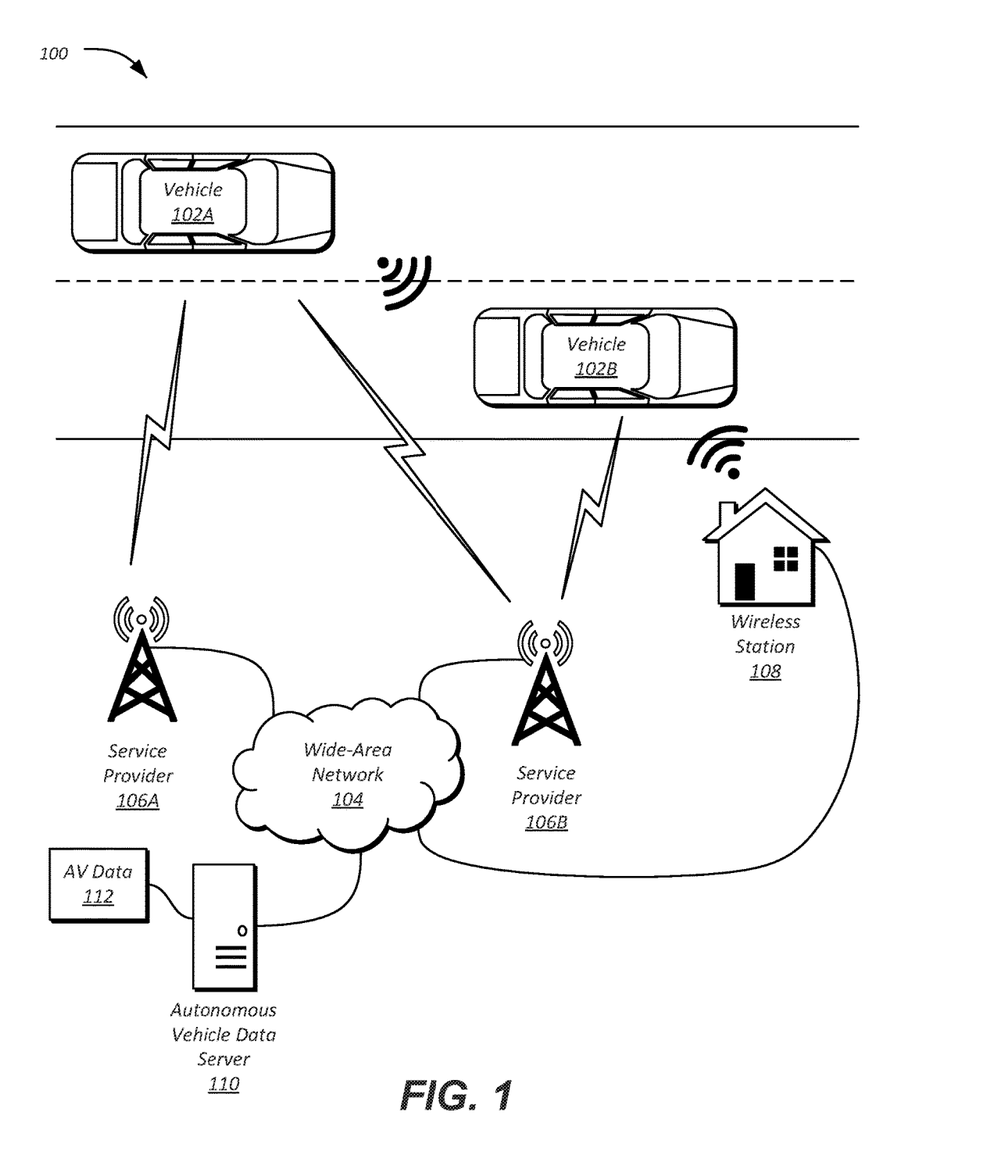
FIG. 1 illustrates an example system including vehicles implementing bandwidth sharing features for communication with an autonomous vehicle data server.

FIG. 1 illustrates an example system 100 including vehicles 102 implementing bandwidth sharing features for communication with an autonomous vehicle data server 110. As shown, the system 100 includes vehicles 102A and 102B (collectively 102) configured to wirelessly communicate with service providers 106A and 106B (collectively 106) and/or wireless stations 108 over a wide-area network 104. The autonomous vehicle data server 110 is also in communication with the wide-area network 104. The vehicles 102 may communicate with one another via Wi-Fi or other wireless communication protocols to allow a vehicle 102 to utilize the connectivity of others vehicles 102. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, service providers 106, wireless stations 108, and or autonomous vehicle data servers 110.

The vehicles 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The wide-area network 104 may include one or more interconnected communication networks such as the Internet, a cable television distribution network, a satellite link network, a local area network, a wide area network, and a telephone network, as some non-limiting examples. By accessing the wide-area network 104, the vehicle 102 may be able to send outgoing data from the vehicle 102 to network destinations on the wide-area network 104, and receive incoming data to the vehicle 102 from network destinations on the wide-area network 104.

The service providers 106 may include system hardware configured to allow cellular transceivers of the vehicles 102 to access the communications services of the wide-area network 104. In an example, the service provider 106 may be a Global System for Mobile communication (GSM) cellular service provider. In another example, the service provider 106 may be a code division multiple access (CDMA) cellular service provider.

The wireless stations 108 may include system hardware configured to support local area network connections between the vehicles 102 and the wide-area network 104. In an example, the wireless stations 108 may support Dedicated Short Range Communications (DSRC) connections between the vehicles 102 and the wireless stations 108. In another example, the wireless stations 108 may support Wi-Fi connections between the vehicles 102 and the wireless stations 108. The wireless stations 108 may also provide connections between the wireless stations 108 and the wide-area network 104 thereby allowing connected vehicles 102 to access the wide-area network apart from use of the service providers 106.

Autonomous vehicles 102 function by utilizing vehicle sensor data and other road environmental data in combination with various driving algorithms. The autonomous vehicle data server 110 may include computing hardware configured to provide autonomous data services to the vehicles 102. In an example, the autonomous vehicle data server 110 may maintain autonomous vehicle (AV) data 112. The AV data 112 may include, for example, 3D model information of roadways. The AV data 112 may also include other information, such as a camera video data feed.

The vehicles 102 may receive AV data 112 of the upcoming vehicle 102 environment from the autonomous vehicle data server 110. Using the AV data 112, the vehicles 102 may identify their specific placement along a route. The autonomous vehicles 102 may also be designed to upload sensed road environmental data to cause the autonomous vehicle data server 110 to update the AV data 112. Accordingly, the autonomous vehicle data server 110 may be further configured to updated the AV data 112 based on information provided to the autonomous vehicle data server 110 from the vehicles 102.

Figure 2:
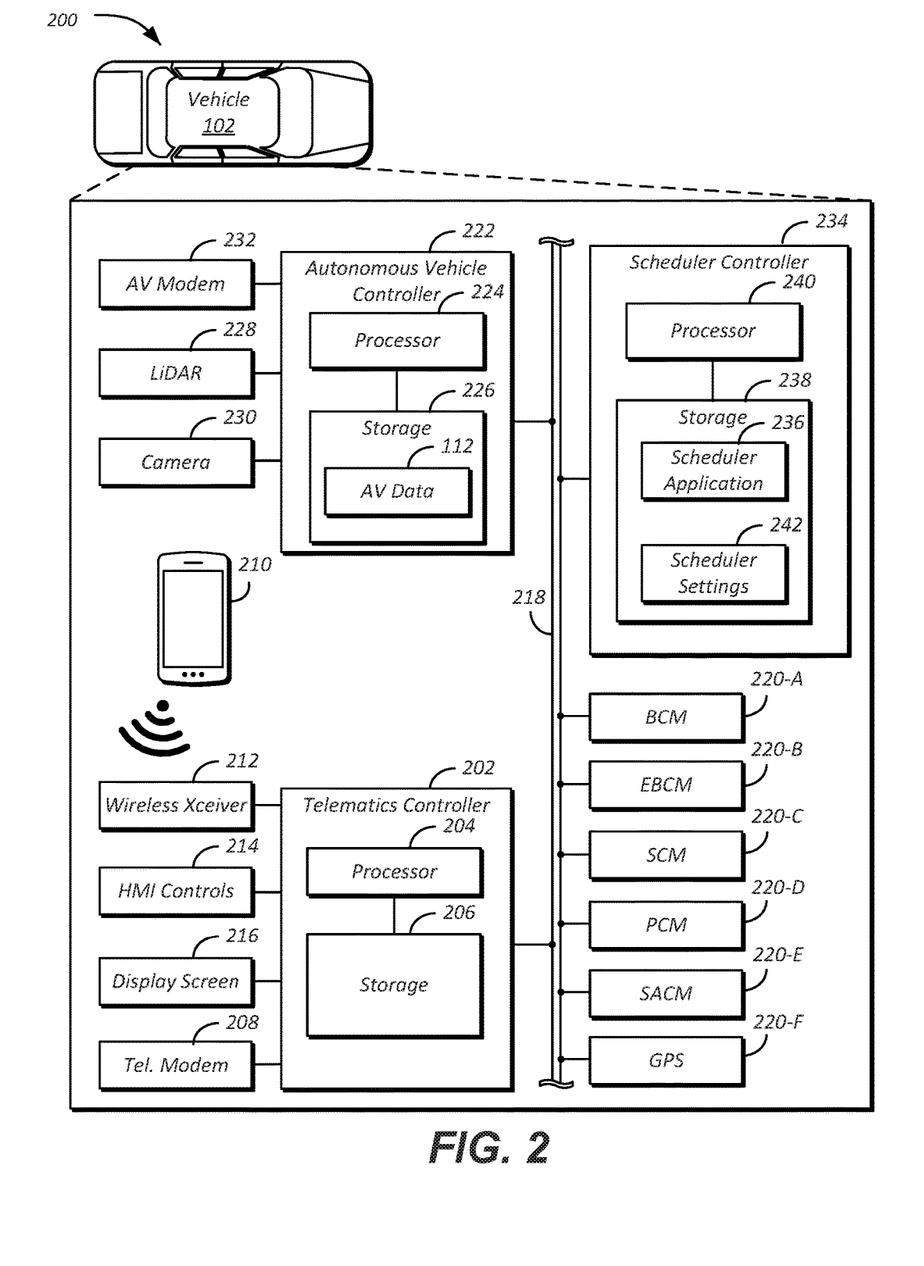
FIG. 2 illustrates an example diagram of the vehicle implementing bandwidth sharing features.

FIG. 2 illustrates an example diagram 200 of the vehicle 102 implementing bandwidth sharing features. The vehicle 102 includes a telematics controller 202 configured to communicate over the wide-area network 104. This communication may be performed using a telematics modem 208 of the telematics controller 202. Each vehicle 102 also includes an autonomous vehicle controller 222 additionally configured to communicate over the wide-area network 104 using a dedicated autonomous vehicle modem 232. While an example vehicle 102 is shown in FIG. 2, the example components as illustrated are not intended to be limiting. Indeed, the vehicle 102 may have more or fewer components, and additional or alternative components and/or implementations may be used.

The telematics controller 202 may be configured to support voice command and BLUETOOTH interfaces with the driver and driver carry-on devices (e.g., mobile devices 210), receive user input via various buttons or other controls, and provide vehicle status information to a driver or other vehicle 102 occupants. An example telematics controller 202 may be the SYNC system provided by FORD MOTOR COMPANY of Dearborn, Mich.

The telematics controller 202 may further include various types of computing apparatus in support of performance of the functions of the telematics controller 202 described herein. In an example, the telematics controller 202 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The telematics controller 202 may be configured to communicate with mobile devices 210 of the vehicle occupants. The mobile devices 210 may be any of various types of portable computing device, such as cellular phones, tablet computers, smart watches, laptop computers, portable music players, or other devices capable of communication with the telematics controller 202. As with the telematics controller 202, the mobile device 210 may include one or more processors configured to execute computer instructions, and a storage medium on which the computer-executable instructions and/or data may be maintained. In many examples, the telematics controller 202 may include a wireless transceiver 212 (e.g., a BLUETOOTH controller, a ZIGBEE transceiver, a Wi-Fi transceiver, etc.) configured to communicate with a compatible wireless transceiver of the mobile device 210. Additionally, or alternately, the telematics controller 202 may communicate with the mobile device 210 over a wired connection, such as via a USB connection between the mobile device 210 and a USB subsystem of the telematics controller 202. Additionally, or alternately, the telematics controller 202 may utilize the wireless transceiver 212 to communicate with Wi-Fi transceivers of wireless stations 108 within the vicinity of a roadway traversed by the vehicle 102. As yet another example, the telematics controller 202 may utilize the wireless transceiver 212 to communicate with other vehicles 102 traversing the roadway.

The telematics controller 202 may also receive input from human-machine interface (HMI) controls 214 configured to provide for occupant interaction with the vehicle 102. For instance, the telematics controller 202 may interface with one or more buttons or other HMI controls 214 configured to invoke functions on the telematics controller 202 (e.g., steering wheel audio buttons, a push-to-talk button, instrument panel controls, etc.). The telematics controller 202 may also drive or otherwise communicate with one or more displays 216 configured to provide visual output to vehicle occupants, e.g., by way of a video controller. In some cases, the display 216 may be a touch screen further configured to receive user touch input via the video controller, while in other cases the display 216 may be a display only, without touch input capabilities. In an example, the display 216 may be a head unit display included in a center console area of the vehicle 102 cabin. In another example, the display 216 may be a screen of a gauge cluster of the vehicle 102.

The telematics controller 202 may be further configured to communicate with other components of the vehicle 102 via one or more in-vehicle networks 218. The in-vehicle networks 218 may include one or more of a vehicle controller area network (CAN), an Ethernet network, and a media oriented system transfer (MOST), as some examples. The in-vehicle networks 218 may allow the telematics controller 202 to communicate with other vehicle 102 systems, such as a body control module (BCM) 220-A, an electronic brake control system (EBCM) 220-B, a steering control system (SCM) 220-C, a powertrain control system (PCM) 220-D, a safety control system (SACM) 220-E, and a global positioning system (GPS) 220-F. As depicted, the controllers 220 are represented as discrete modules and systems. However, the controllers 220 may share physical hardware, firmware, and/or software, such that the functionality from multiple controllers 220 may be integrated into a single module 220, and that the functionality of various such controllers 220 may be distributed across a plurality of controllers 220.

The BCM 220-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 220-A may be configured to manage vehicle 102 access functions, such as keyless entry, remote start, and point of access status verification (e.g., closure status of the hood, doors and/or trunk of the vehicle 102).

The EBCM 220-B may be configured to control braking functions of the vehicle 102. In some examples, the EBCM 220-B may be configured to receive signal information from vehicle wheel sensors and/or drivetrain differentials, and manage anti-lock and anti-skid brake functions through control of brake line valves that adjust brake pressure from the master cylinder.

The SCM 220-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 220-D may be configured to perform engine control and transmission control functions for the vehicle 102. With respect to engine control, the PCM 220-D may be configured to receive throttle input and control actuators of the vehicle engine to set air/fuel mixture, ignition timing, idle speed, valve timing, and other engine parameters to ensure optimal engine performance and power generation. With respect to transmission control, the PCM 220-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality.

The SACM 220-E may be configured to provide various functions to improve the stability and control of the vehicle 102. As some examples, the SACM 220-E may be configured to monitor vehicle sensors (e.g., steering wheel angle sensors, yaw rate sensors, lateral acceleration sensors, wheel speed sensors, etc.), and control the BCM 220-A, SCM 220-C, and/or PCM 220-D. As some possibilities, the SACM 220-E may be configured to provide throttle input adjustments, steering angle adjustments, brake modulation, and all-wheel-drive power split decision-making over the vehicle bus 218 to improve vehicle stability and controllability. It should be noted that in some cases, the commands provided by the SACM 220-E may override other command input provided by the driver or by the autonomous vehicle controller 222.

The GPS 220-F configured to provide vehicle 102 current location and heading information, and various other vehicle controllers 220 configured to cooperate with the telematics controller 202.

The autonomous vehicle controller 222 may include and/or communicate with various types of computing apparatus to facilitate the performance of the autonomous vehicle 102 functions. In an example, the autonomous vehicle controller 222 may include one or more processors 224 configured to execute computer instructions, and a storage medium 226 on which the computer-executable instructions and/or AV data 112 may be maintained.

The autonomous vehicle controller 222 may receive input from various sensors. In an example, the autonomous vehicle controller 222 may be in communication with Lidar sensors 228. In other example, the autonomous vehicle controller 222 may additionally or alternately be in communication with laser, radar, sonar, or other types of distance and/or obstacle sensors. The autonomous vehicle controller 222 may be in communication with one or more camera 230 devices configured to capture information regarding the surroundings of the vehicle 102.

The autonomous vehicle controller 222 may further utilize an autonomous vehicle modem 232 to communicate data (e.g., AV data 112) between the vehicle 102 and the autonomous vehicle data server 110 accessible over the wide-area network 104. In some examples, the autonomous vehicle modem 232 may be configured to communicate with the same service provider 106 providing communications services to the telematics modem 208. In other examples, autonomous vehicle modem 232 may be configured to communicate with a different service provider 106 than the service provider 106 providing communications services to the telematics modem 208. In one example, the telematics modem 208 may access the wide-area network 104 using the service provider 106A shown in FIG. 1, while the autonomous vehicle modem 232 may access the wide-area network 104 using the service provider 106B shown in FIG. 1.

The autonomous vehicle controller 222 may utilize driving algorithms to command braking, steering, acceleration, and other functions of the vehicle 102. These algorithms may be stored to the storage 226 and executed by the one or more processors 224 of the autonomous vehicle controller 222 to command the vehicle 102. The autonomous vehicle controller 222 may accordingly command the vehicle 102 based on inputs such as the AV data 112 received from the autonomous vehicle data server 110, sensor input received from the Lidar sensors 228 (or other sensors), image input received from the one or more camera 230 devices, and data from the various controllers 220 received over the vehicle bus 218.

The amounts of data being uploaded and downloaded by the autonomous vehicles 102 may be significant and may require substantial bandwidth (e.g., connection throughput). For example, a single autonomous vehicle 102 may require a data upload link of 50 Megabits per second (Mbps) while traversing a road. However, such bandwidth may exceed the capabilities of the autonomous vehicle modem 232, or of the cellular or other networks to which the autonomous vehicle modem 232 may be connected, which may only support peak upload speed of ~20 Mbps in preferred conditions, and less for moving vehicles 102.

In many implementations of autonomous vehicle 102, autonomous vehicle functionality utilizes the autonomous vehicle modem 232 as a dedicated modem specifically utilized for upload and download of autonomous vehicle data, leaving the traditional vehicle telematics modem 208 for traditional telematics services of the telematics controller 202. Thus, the telematics controller 202 and telematics modem 208 are unavailable for use in communicating AV data 112. Additionally, if one vehicle 102 is suffering from poor network throughput, that vehicle 102 (e.g., the vehicle 102A in FIG. 1) may be unable to use spare capacity of a proximate neighbor vehicle 102 (e.g., the vehicle 102B in FIG. 1) to augment the data connectivity of the autonomous vehicle 102.

To provide for bandwidth sharing features, the vehicle 102 may include a scheduler controller 234. The scheduler controller 234 may include a scheduler application 236 stored to a storage 238 of the scheduler controller 234 that, when executed by the one or more processors 240 of the scheduler controller 234, causes the autonomous vehicle controller 222 and telematics controller 202 to perform bandwidth sharing features. The bandwidth sharing features may include utilizing the telematics modem 208 to "borrow" bandwidth from the telematics controller 202 to increase overall vehicle 102 network bandwidth for autonomous functions. Additionally, these bandwidth-sharing features may include access to the wireless transceiver 212 component of the telematics controller 202 to attach to Wi-Fi hotspots or communicate via dedicated short-range communications (DSRC) to increase bandwidth. Further, the vehicle 102 may address poor network throughput via its included network connections by accessing communications services of other vehicles 102 via the wireless transceiver 212. Thus, the vehicle 102 may be able to simultaneously communicate or offload data using multiple connections to the wide-area network 104. Details of an example algorithm performed via the scheduler application 236 is discussed in detail below with respect to FIG. 5. Which specific bandwidth sharing features are to be performed may be based on scheduler settings 242, examples of which are discussed in detail with respect to FIGS. 3-4.

As illustrated, the functionality of the scheduler application 236 is performed by a dedicated scheduler controller 234. However, it should be noted that in other examples, the functionality of the scheduler application 236 may be implemented by components of the autonomous vehicle controller 222 and/or the telematics controller 202.

Figure 3:
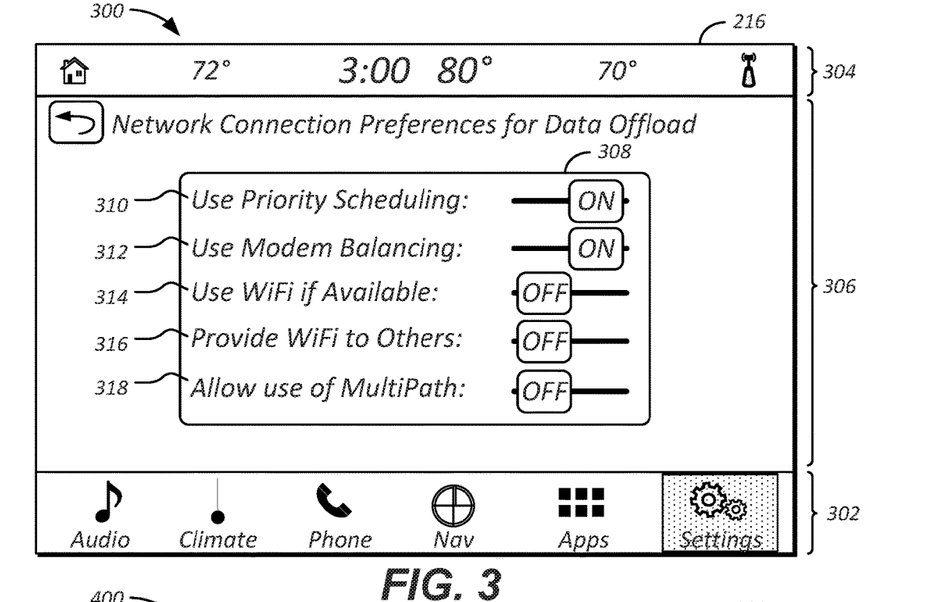
FIG. 3 illustrates an example of the telematics controller displaying a scheduler application settings user interface for configuration of the scheduler settings.

FIG. 3 illustrates an example of the telematics controller 202 displaying a scheduler application settings user interface 300 for configuration of the scheduler settings 242. In an example, the user interface 300 may be displayed on a head unit or other display 216 of the vehicle 102.

As shown, the interface 300 includes a category listing 302 of one or more screens of content to be displayed in the main screen area 306 of the head unit display 216. As some examples, the category listing 302 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display 216 may be accessed. The user interface 300 may also include a general information area 304 from which time, current temperature, and other information may remain visible to the user, regardless of the specific screen or application that is active in the main screen area 306.

The main screen area 306 may show summary content from multiple of the categories of content. In an example, the main screen area 306 may display an audio summary indicating a reduced version of the content displayed when the audio settings are selected, and a phone summary indicating a reduced version of the content displayed when the phone settings are selected.

The scheduler application settings user interface 300 may be displayed, for example, responsive to user selection of the scheduler application settings from a settings screen displayed upon selection of the settings screen from the category listing 302. As shown, the scheduler application settings user interface 300 provides a set of configurable options 308 displayed to the main screen area 306 that may be used by a user to adjust the scheduler settings 242.

The options 308 may include a use priority scheduling setting 310, a use modem balancing setting 312, a use Wi-Fi if available setting 314, a provide Wi-Fi to others setting 316, and an allow use of multipath setting 318.

The use priority scheduling setting 310 may allow the user to choose whether or not to perform prioritization of select data flows over other data flows to and from the vehicle 102. In an example, different types of data may be assigned to different priorities. For instance, data from the Lidar sensors 228 may be assigned to a first priority, and data from the cameras 230 may be assigned to a second, lower priority. Based on the priority, higher priority data may be scheduled by the scheduler application 236 to be transmitted first. Or, based on the priority, higher priority data may be deemed eligible to be scheduled for transmission using the telematics modem 208 and/or wireless transceiver 212, while lower priority data may only be transmittable using the AV modem 232. As yet another example, high priority telematics service such as a remote control service may suspend a low priority task until the service completes. If the user selects to enable prioritization, then data priority may be taken into account by the scheduler application 236 in data scheduling decisions. If not, then data priority may not be taken into account by the scheduler application 236 in data scheduling decisions The use modem balancing setting 312 may allow the user to choose whether or not to allow the autonomous vehicle controller 222 to access the telematics modem 208 to simultaneously communicate or offload data. If the user selects to enable use of modem balancing, then the telematics modem 208 may be utilized by the scheduler application 236 for data scheduling. If not, then the telematics modem 208 may not be used by the scheduler application 236 for data scheduling.

The use of Wi-Fi if available setting 314 may allow the user to choose whether or not to allow the autonomous vehicle controller 222 to access the wireless transceiver 212 to communicate or offload data. If the user selects to enable use of Wi-Fi, then the wireless transceiver 212 may be utilized by the scheduler application 236 for data scheduling (e.g., via connections to other vehicles 102 and/or wireless stations 108). If not, then the wireless transceiver 212 may not be used by the scheduler application 236 for data scheduling.

The provide Wi-Fi to others setting 316 may allow the user to choose whether or not to allow the autonomous vehicle controller 222 to accept data from other vehicles for offload using the data connections of the vehicle 102. If the user selects to enable use of Wi-Fi by others, then the telematics modem 208 and/or wireless transceiver 212 of the vehicle 102 may be utilized by the scheduler application 236 for data scheduling of data for other vehicles 102 in communication with the vehicle 102. If not, then the telematics modem 208 and/or wireless transceiver 212 may not be used by the scheduler application 236 for data scheduling of data for other vehicles 102.

The allow use of multipath setting 318 may allow the user to choose whether or not to enable multipath technology. Multipath technology is used to send data using several IP-addresses/interfaces by a modification of Transmission Control Protocol (TCP) that presents a regular TCP interface to applications, while in fact spreading data across several separate data flows. In an example, if selected, the scheduler application 236 may utilize the telematics modem 208 and/or wireless transceiver 212 (if available) simultaneously for data transfer along with the AV modem 232. In the multipath mode, the telematics modem 208 and/or wireless transceiver 212 may operate in multipath slave mode, while the AV modem 232 may operate as the multipath master. If not selected, then multipath may not be used.

Figure 4:
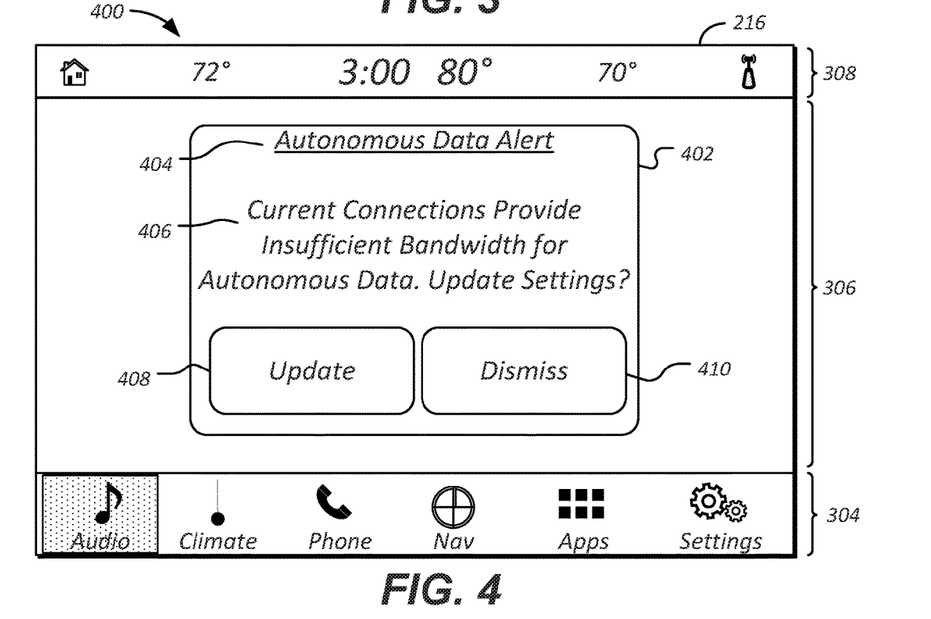
FIG. 4 illustrates an example of the telematics controller displaying a user interface including a scheduler alert.

FIG. 4 illustrates an example of the telematics controller 202 displaying a user interface 400 including a scheduler alert 402. In an example, the user interface 300 may be displayed on a head unit or other display 216 of the vehicle 102

The scheduler alert 402 may be displayed responsive to a command from the scheduler controller 234 to the telematics controller 202, e.g., via the vehicle bus 218. The command may indicate, as shown in the alert 402, that current data connections of the vehicle 102 are insufficient for the data tasks to be performed. In an example, the scheduler application 236 may monitor the speed of the available connections to the vehicle 102, and may determine based on the amount of AV data 112 to be offloaded that the current connection(s) are insufficient. If so, the scheduler application 236 may provide the command to the telematics controller 202 to request that additional communications services of the telematics controller 202 be made available to the autonomous vehicle controller 222.

As shown, the alert includes a title 404 indicating that the alert related to autonomous vehicle data, and a message 406 indicating that the current connections provide insufficient bandwidth for autonomous data. The alert 402 may further include an update control 408 that, when selected by the user, causes the telematics controller 202 to send a message back to the autonomous vehicle controller 222 authorizing the autonomous vehicle controller 222 to adjust the scheduler settings 242. The alert 402 may also include a dismiss control 410 that, when selected by the user, causes the telematics controller 202 to send a message back to the autonomous vehicle controller 222 denying the autonomous vehicle controller 222 to adjust the scheduler settings 242.

By using the scheduler alert 402, the scheduler controller 234 may be able to automatically reconfigure the scheduler settings 242 to provide for use of bandwidth sharing features when necessary. In some cases, the changes made by the scheduler controller 234 may be temporary, and may reset to the previous user settings responsive to a determination by the scheduler controller 234 that additional bandwidth is no longer required, or based on other conditions, such as vehicle 102 key off (i.e., parking and shutdown).

Figure 5:
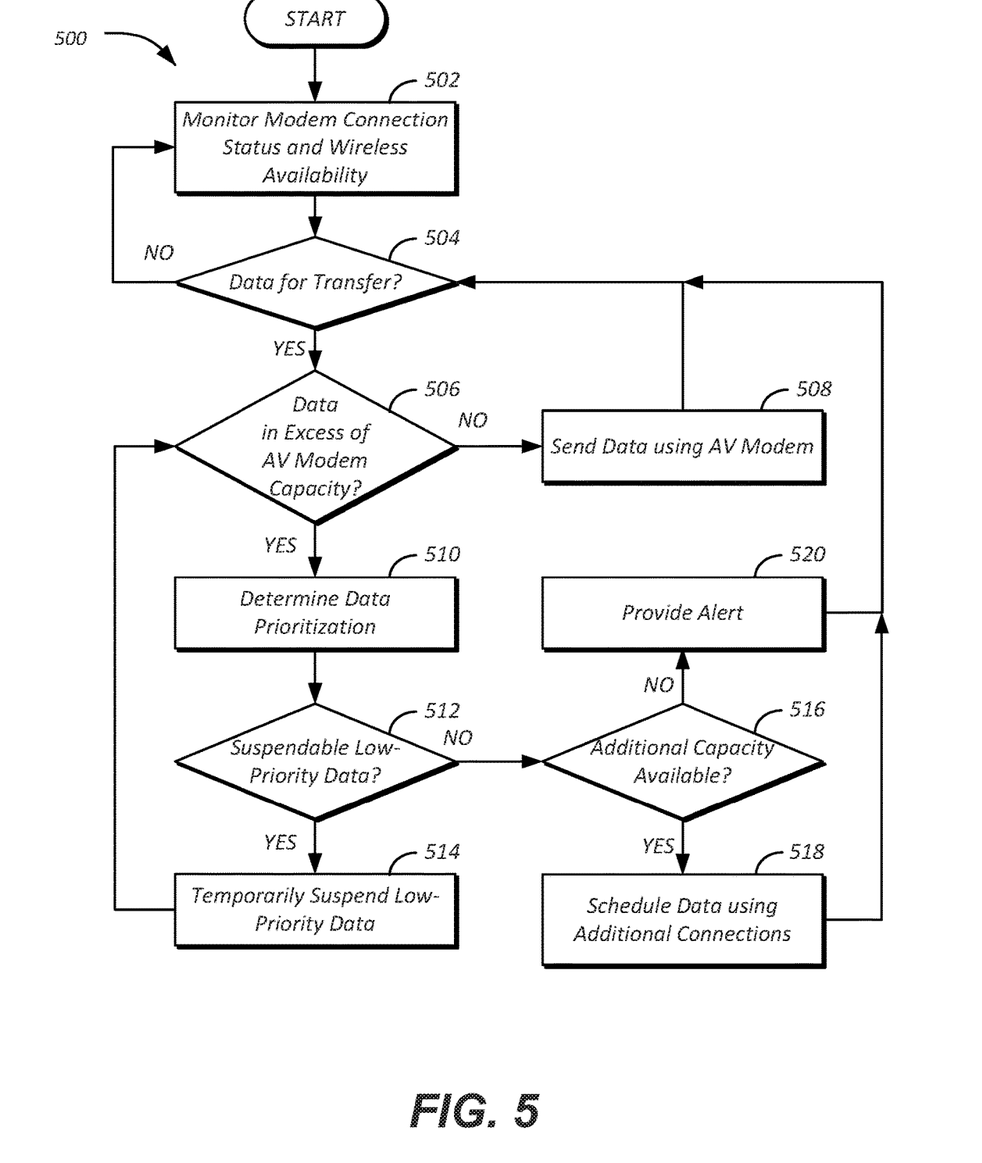
FIG. 5 illustrates an example process for implementing bandwidth sharing features for communication with an autonomous vehicle data server.

FIG. 5 illustrates an example process 500 for implementing bandwidth sharing features for communication with an autonomous vehicle data server 110. In an example, the process 500 may be performed by the scheduler controller 234 in communication with the components of the vehicle 102 discussed above.

At operation 502, the scheduler controller 234 monitors modem connection status and wireless availability. In an example, the scheduler controller 234 queries the autonomous vehicle controller 222 over the vehicle bus 218 for information indicative of the connection availability and speed of the connection over the AV modem 232, and also queries the telematics controller 202 over the vehicle bus 218 for information indicative of the connection availability and speed of the connection over the telematics modem 208 and/or wireless transceiver 212.

At operation 504, the scheduler controller 234 determines whether data is ready for transfer. In an example, the scheduler controller 234 queries the autonomous vehicle controller 222 over the vehicle bus 218 for information indicative of the quantity of AV data 112 currently awaiting data offload to the autonomous vehicle data server 110. In another example, the scheduler controller 234 may determine whether data traffic from other vehicles 102 is awaiting forwarding from the vehicle 102 over the wide-area network 104 to the autonomous vehicle data server 110. Such data may be stored to the telematics controller 202 and/or to the autonomous vehicle controller 222.

At operation 506, the scheduler controller 234 determines whether the data to be transferred is in excess of the capacity of the AV modem 232. In an example, the scheduler controller 234 may compare the amount of data to offload to the monitored data rate of the AV modem 232. If the data can be offloaded within the capacity of the AV modem 232, control passes to operation 508. If the data cannot be offloaded within a predefined period of time (e.g., five minutes), or if the data cannot be offloaded at the rate that data is becoming ready for transfer, control passes to operation 510. At operation 508, the scheduler controller 234 sends the data using the AV modem 232. After operation 508, control passes to operation 804.

At operation 510, the scheduler controller 234 determines a data prioritization. In an example, if the scheduler settings 242 allow for data prioritization, the scheduler controller 234 prioritizes the data to be offloaded to conserve communications resources. For instance, data from the Lidar sensors 228 may be assigned to a first priority, and data from the cameras 230 may be assigned to a second, lower priority. Based on the priority, higher priority data may be scheduled by the scheduler application 236 to be transmitted first.

At operation 512, the scheduler controller 234 identifies whether any low-priority data is suspend-able. In an example, if data prioritization is being performed, and suspend-able data is found, then control passes to operation 514 to temporarily suspend those data flows. An example of a suspend-able data flow may be a visible light camera feed, while a non-suspend-able data flow may be a 3D navigation map feed. After operation 514, control returns to operation 506. It should be noted that the temporary suspension of the data flow may time-out after a predefined threshold (e.g., five minutes, vehicle key-off, etc.), and/or may expire when the data is no longer in excess of capacity.

At operation 516, the scheduler controller 234 determines whether additional bandwidth capacity is available. In an example, if the scheduler settings 242 allow for capacity of the telematics modem 208 and/or wireless transceiver 212 to be utilized, and those devices have available bandwidth as monitored at operation 502, control passes to operation 518 to schedule the data transfer using the additional capacity. If additional capacity is available but the scheduler settings 242 do not allow for utilization of the capacity, control passes to operation 520 to provide a scheduler alert 402. An example scheduler alert 402 requesting an update to the scheduler settings 242 is discussed above with respect to FIG. 4. After operations 518 or 520, control passes to operation 504.

Thus, the scheduler controller 234 may be utilized by the vehicle 102 to utilize the connectivity of others components of the vehicle 102 to the wide-area network 104 and also other vehicles 102 to access the autonomous vehicle data server 110.

Computing devices described herein, such as the autonomous vehicle data server 110, telematics controller 202, mobile device 210, controllers 220, autonomous vehicle controller 222, and scheduler controller 234, generally include computer-executable instructions where the instructions may be executable by one or more computing devices such as those listed above. Computer-executable instructions, such as those of the navigation application 122, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a telematics controller, connected to a first modem to communicate over a wide-area network;
   an autonomous vehicle controller, connected to a second modem to communicate over the network, programmed to send autonomous vehicle commands determined using autonomous vehicle data to control the vehicle; and
   a scheduler controller programmed to direct the telematics controller and autonomous vehicle controller to simultaneously communicate autonomous vehicle data over the network using the first and second modems.

2. The vehicle of claim 1, wherein the first modem is configured to connect to the wide-area network using a first service provider, and the second modem is configured to connect to the wide-area network using a second service provider.

3. The vehicle of claim 1, wherein the autonomous vehicle data includes bus traffic captured from a vehicle bus of the vehicle.

4. The vehicle of claim 1, wherein the autonomous vehicle data includes data captured by Lidar sensors of the vehicle.

5. The vehicle of claim 1, wherein the autonomous vehicle data includes image data captured by one or more cameras of the vehicle.

6. A method comprising:
   sending a prioritized subset of autonomous vehicle data to control the vehicle, to a remote server connected to a wide-area network, simultaneously using a combination of connections to the wide-area network provided using at least two of a telematics controller modem, an autonomous vehicle controller modem, and a vehicle WiFi transceiver; and
   offloading a non-prioritized subset of the autonomous vehicle data using the autonomous vehicle controller modem but neither the telematics controller modem nor the vehicle WiFi transceiver.

7. The method of claim 6, further comprising providing an autonomous data alert responsive to determining that the connections have insufficient combined bandwidth for offloading the prioritized subset of autonomous vehicle data.

8. The method of claim 6, further comprising providing an autonomous data alert responsive to determining that the connections have insufficient combined throughput for offloading both the prioritized subset of autonomous vehicle data and the non-prioritized subset of autonomous vehicle data.

9. The method of claim 6, wherein the prioritized subset of autonomous vehicle data includes data from Lidar sensors, and the non-prioritized subset of autonomous vehicle data includes data from vehicle cameras.

10. The method of claim 6, further comprising providing an autonomous data alert requesting a setting update responsive to determining that the connections have insufficient combined bandwidth for offloading the prioritized subset of autonomous vehicle data, but only the autonomous vehicle controller modem is selected in vehicle settings for use in offloading of the prioritized subset of autonomous vehicle data.

11. The method of claim 6, further comprising:
communicating between an autonomous vehicle controller and a telematics controller over a vehicle bus; and
sending autonomous vehicle commands determined by the autonomous vehicle controller over the vehicle bus to control a vehicle.

12. The method of claim 6, further comprising:
connecting to the wide-area network by the autonomous vehicle controller modem using a first service provider; and
connecting to the wide-area network by the telematics controller modem using a second service provider.

13. A non-transitory computer-readable medium comprising instructions that, when executed by one or more processors of a vehicle, cause the one or more processors to:
connect to a wide-area network by a first modem of an autonomous vehicle controller using a first service provider;
connect to the wide-area network by a second modem of a telematics controller using a second service provider;
receive first autonomous vehicle data from another vehicle via a wireless transceiver of the telematics controller;
receive second autonomous vehicle data from sensors of the vehicle; and
responsive to determining that vehicle settings permit offloading of autonomous vehicle data, direct the telematics controller and autonomous vehicle controller to offload the first and second autonomous vehicle data over the wide-area network using the first and second modems;
offload a prioritized subset of the first and second autonomous vehicle data to a remote server connected to the wide-area network using the first and second modems; and
offload a non-prioritized subset of the first and second autonomous vehicle data using the first modem but not the second modem.

14. The medium of claim 13, wherein the first autonomous vehicle data includes bus traffic captured from a vehicle bus of the other vehicle, and the second autonomous vehicle data includes bus traffic captured from a vehicle bus of the vehicle.

15. The medium of claim 13, wherein the first autonomous vehicle data includes data captured by Lidar sensors of the other vehicle, and the second autonomous vehicle data includes data captured by Lidar sensors of the vehicle.

16. The medium of claim 13, wherein the first autonomous vehicle data includes image data captured by one or more cameras of the other vehicle, and the second autonomous vehicle data includes image data captured by one or more cameras of the vehicle.

\* \* \* \* \*